(12) United States Patent
Taylor et al.

(10) Patent No.: US 9,162,550 B2
(45) Date of Patent: Oct. 20, 2015

(54) WIRE HARNESS MOUNTING ASSEMBLY

(71) Applicant: DENSO International America, Inc., Southfield, MI (US)

(72) Inventors: Dwayne R. Taylor, Livonia, MI (US); Aaron Martin, Brighton, MI (US); Jeffrey Basinski, Grand Blanc, MI (US)

(73) Assignee: DENSO International America, Inc., Southfield, MI (US)

( * ) Notice: Subject to any disclaimer, the term of this patent is extended or adjusted under 35 U.S.C. 154(b) by 51 days.

(21) Appl. No.: 14/048,481

(22) Filed: Oct. 8, 2013

(65) Prior Publication Data

US 2015/0097089 A1    Apr. 9, 2015

(51) Int. Cl.
*B60R 16/00* (2006.01)
*B60H 1/00* (2006.01)
*B60K 11/02* (2006.01)

(52) U.S. Cl.
CPC ............ *B60H 1/00507* (2013.01); *B60K 11/02* (2013.01)

(58) Field of Classification Search
CPC ... B60R 16/0215; B60R 16/0207; H02G 3/26
See application file for complete search history.

(56) References Cited

U.S. PATENT DOCUMENTS

| | | | | |
|---|---|---|---|---|
| 5,401,905 A * | 3/1995 | Lesser et al. | ................ | 174/99 R |
| 5,573,299 A * | 11/1996 | Masuda | ................... | 296/193.09 |
| 5,601,261 A * | 2/1997 | Koike | .............................. | 248/71 |
| 5,962,814 A * | 10/1999 | Skipworth et al. | ............ | 174/135 |
| 6,076,781 A * | 6/2000 | Kraus | ............................. | 248/73 |
| 6,293,504 B1 * | 9/2001 | Hartmann | ..................... | 248/74.1 |
| 6,557,889 B2 * | 5/2003 | Breed | ............................ | 280/735 |
| 6,590,162 B1 * | 7/2003 | Luedicke et al. | ............. | 174/135 |
| 6,700,064 B2 * | 3/2004 | Aoki et al. | ....................... | 174/69 |
| 7,151,222 B1 * | 12/2006 | Jetton | ........................ | 174/68.3 |
| 7,964,795 B2 * | 6/2011 | Kato | ........................... | 174/72 A |
| 8,225,898 B2 * | 7/2012 | Kuwabara et al. | ............ | 180/233 |
| 8,573,681 B2 * | 11/2013 | Yamato et al. | ........... | 296/190.05 |
| 8,579,239 B2 * | 11/2013 | Lothamer | ........................ | 248/69 |
| 8,816,525 B2 * | 8/2014 | Okumura | ...................... | 307/10.1 |
| 8,847,073 B2 * | 9/2014 | Tokunaga et al. | ........... | 174/72 A |
| 2001/0000886 A1 * | 5/2001 | Breed et al. | .................... | 180/274 |
| 2006/0239796 A1 * | 10/2006 | Franks | ........................ | 411/455 |
| 2008/0041608 A1 * | 2/2008 | Thiel | ........................... | 174/68.3 |
| 2010/0186197 A1 * | 7/2010 | Inomata et al. | ............... | 24/16 R |
| 2011/0147540 A1 * | 6/2011 | Rivara et al. | ................. | 248/68.1 |
| 2011/0308853 A1 * | 12/2011 | Schultz | ........................ | 174/70 R |
| 2013/0068522 A1 * | 3/2013 | Ogawa et al. | .............. | 174/72 A |
| 2013/0220697 A1 * | 8/2013 | Takeuchi et al. | ............ | 174/70 R |
| 2013/0228367 A1 * | 9/2013 | Sato et al. | ...................... | 174/480 |
| 2013/0292159 A1 * | 11/2013 | Gotou et al. | .................. | 174/250 |
| 2013/0313376 A1 * | 11/2013 | Shirey et al. | ................. | 248/74.3 |
| 2014/0060923 A1 * | 3/2014 | Takaya | ......................... | 174/72 A |
| 2014/0151514 A1 * | 6/2014 | Asai | .............................. | 248/74.1 |
| 2014/0304951 A1 * | 10/2014 | Dodd | .......................... | 24/136 B |
| 2014/0306522 A1 * | 10/2014 | Nagayasu | ..................... | 307/10.1 |
| 2014/0317921 A1 * | 10/2014 | Yamamoto et al. | ............ | 29/856 |
| 2014/0333130 A1 * | 11/2014 | Matano et al. | ............... | 307/10.7 |
| 2014/0346290 A1 * | 11/2014 | Yoshida et al. | .............. | 248/74.1 |
| 2014/0377987 A1 * | 12/2014 | Germain | ...................... | 439/532 |

\* cited by examiner

*Primary Examiner* — Bradley Duckworth

(74) *Attorney, Agent, or Firm* — Harness, Dickey & Pierce, P.L.C.

(57) ABSTRACT

The present teachings provide for a wire harness mounting assembly including a first retention member, a first guide member, a second retention member, and a second guide member. The first retention member and the first guide member are each configured to be spaced apart from the second retention member and the second guide member to suspend a wire harness across a space defined therebetween.

20 Claims, 4 Drawing Sheets

WIRE HARNESS MOUNTING ASSEMBLY

FIELD

The present disclosure relates to a wire harness mounting assembly.

BACKGROUND

This section provides background information related to the present disclosure, which is not necessarily prior art.

A wire harness can be used in a variety of applications for a variety of different purposes, such as to protect and direct one or more wires between two points. For example, a wire harness can be used to protect and direct wiring extending from an electrical connector to a fan or blower configured to direct airflow to a radiator for cooling an engine, such as a motor vehicle engine. In such an application, it is often desirable to secure the wire harness as close to the radiator tank as possible without the wire harness sagging along its length, and in a manner that will permit easy installation of the wire harness with the radiator tank already installed. A wire harness mounting assembly able to provide these advantages would thus be desirable.

SUMMARY

This section provides a general summary of the disclosure, and is not a comprehensive disclosure of its full scope or all of its features.

The present teachings provide for a wire harness mounting assembly including a first retention member, a first guide member, a second retention member, and a second guide member. The first retention member and the first guide member are each configured to be spaced apart from the second retention member and the second guide member to suspend a wire harness across a space defined therebetween.

The present teachings also provide for a wire harness mounting assembly including a first mounting bracket and a second mounting bracket spaced apart from the first mounting bracket. The first mounting bracket includes a first retention member and a first guide member. The second mounting bracket includes a second retention member and a second guide member. At least one of the first guide member and the second guide member are orientated to direct a wire harness extending therebetween away from a longitudinal axis extending between the first mounting bracket and the second mounting bracket such that the wire harness is offset from the longitudinal axis at a point between the first guide member and the second guide member.

The present teachings further provide for a wire harness mounting assembly including a first mounting bracket having a first side facing a radiator tank when the first mounting bracket is positioned at the radiator tank, a second side opposite to the first side, and a first wire harness guide member. A first retention member including a first coupling member is configured to extend through an opening defined by the first mounting bracket and engage the first side. A first wire harness securing member is configured to mount a wire harness at the second side. A second mounting bracket is spaced apart from the first mounting bracket and includes a first side facing the radiator tank when the second mounting bracket is coupled to the radiator tank. A second side is opposite to the first side. The second wire harness guide member is angled towards the radiator tank when the second mounting bracket is coupled to the radiator tank to direct the wire harness towards the radiator tank and away from a longitudinal axis extending between the first and the second mounting brackets. A second retention member includes a second coupling member configured to extend through an opening defined by the second mounting bracket and removably engage the first side thereof. A second wire harness securing member is configured to mount the wire harness at the second side of the second mounting bracket.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
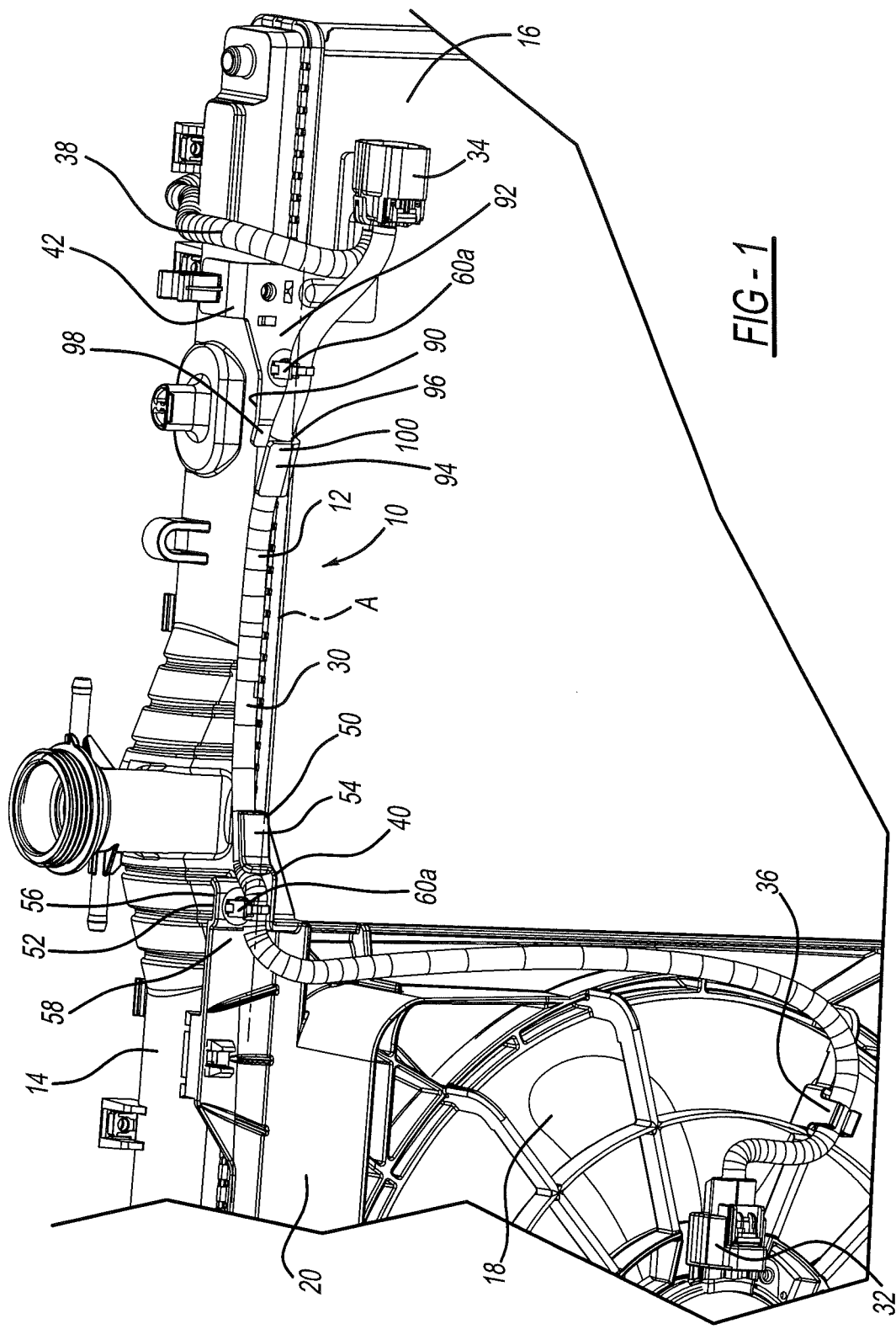
FIG. 1 is a perspective view of a wire harness mounting assembly according to the present teachings configured to secure a wire harness proximate to a radiator tank.

With initial reference to FIG. 1, a wire harness mounting assembly according to the present teachings is generally illustrated at reference numeral 10. The wire harness mounting assembly 10 is configured to mount a wire harness 12 proximate to a radiator tank 14 of a radiator core 16. A fan or blower 18 is mounted at the radiator core 16 and is configured to direct airflow to the radiator core 16. The fan 18 is housed within a fan shroud 20. Although the wire harness mounting assembly 10 is illustrated and described herein as being configured to support and secure the wire harness 12 proximate to the radiator tank 14, which is configured to permit the flow of engine coolant therethrough, the wire harness mounting assembly 10 can be used in any other suitable application where it is desirable to retain a wire harness at a particular location and/or orientation.

The wire harness 12 generally includes a flexible tube 30, which is configured to protect and direct wires extending therethrough. For example and as illustrated in FIG. 1, the flexible tube 30 extends from a fan connector 32 to an electrical connector 34 in order to protect wires that extend therethrough and conduct current to power the fan 18. The wire harness mounting assembly 10 is configured to direct the flexible tube 30 along the radiator tank 14 and to retain the flexible tube 30 in close proximity to the radiator tank 14, as described further herein.

At the fan shroud 20, a fan shroud guide 36 retains the flexible tube 30 against the fan shroud 20. The fan shroud guide 36 can be any suitable coupling or retention member, such as a clip including a pair of opposing flanges as illustrated. An additional wire harness 38 extends from the electrical connector 34 to a side of the radiator tank 14 that is opposite to the fan 18 in order to, for example, direct wiring to another fan (not shown) at an opposite side of the radiator core 16.

The wire harness mounting assembly 10 generally includes a first mounting bracket 40 and a second mounting bracket 42. The first mounting bracket 40 is also referred to herein as a fan shroud bracket. With continued reference to FIG. 1 and additional reference to FIGS. 2 and 3, the first mounting bracket 40 generally includes a base member 50, an inner vertical flange 52, and an outer vertical flange 54, which together are generally portions of a first guide member. The inner vertical flange 52 includes an inner surface 56 facing the radiator tank 14 and an outer surface 58, which is opposite to the inner surface 56 and thus faces away from the radiator tank 14. The outer vertical flange 54 extends from the base member 50, and extends generally perpendicular to the base member 50. The inner vertical flange 52 also extends generally perpendicular to the base member 50, and may extend from the base member 50 at a location offset from the base member 50. Although the first mounting bracket 40 is illustrated as being integral with the fan shroud 20, the first mounting bracket 40 can be separate therefrom, and mounted in any suitable manner. For example, the first mounting bracket 40 can be mounted directly to the radiator tank 14.

Figure 4A:
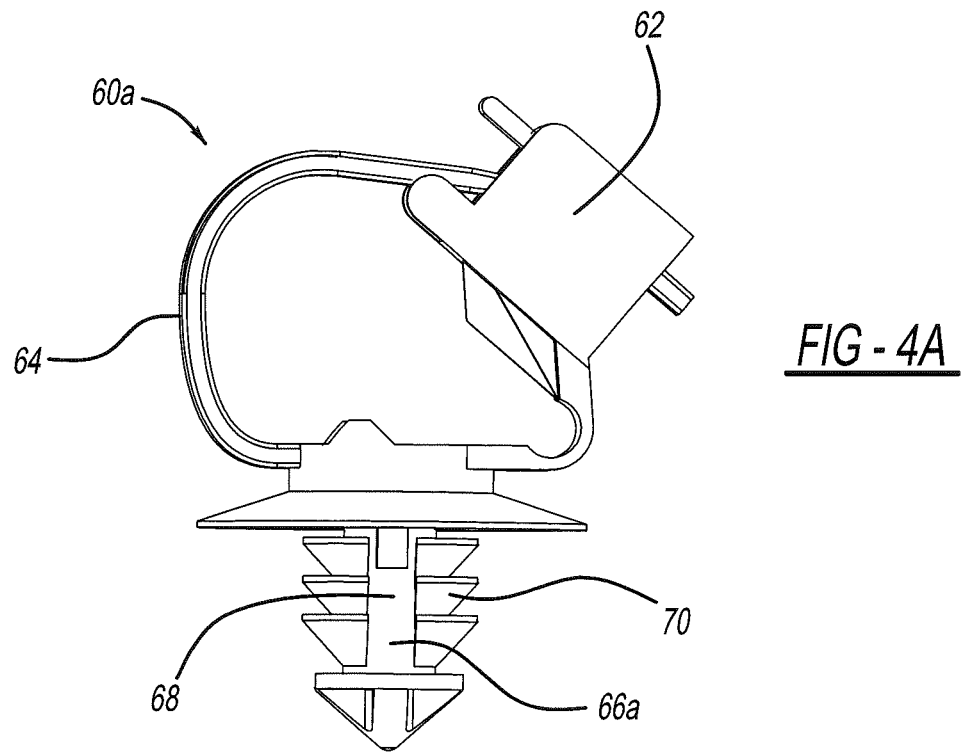
FIG. 4A is a side view of a retention member of the wire harness mounting assembly according to the present teachings.

The first mounting bracket 40 further includes a first retention member 60a. With reference to FIG. 4A, the first retention member 60a generally includes a body 62, a wire harness securing member 64, and a first coupling member 66a. The wire harness securing member 64 can be any suitable member for coupling the wire harness 12 to the first retention member 60a, such as a tie strap as illustrated. The wire harness securing member 64 extends from the body 62 and is received by the body 62 at a distal end thereof in order to define a loop configured to accommodate the wire harness 12 therethrough. Upon tightening the wire harness securing member, the loop becomes smaller in order to securely wrap around the wire harness 12 and secure the wire harness 12 to the first retention member 60a. The wire harness securing member 64 can be tightened against the wire harness 12 to secure the wire harness 12 longitudinally along axis A (FIGS. 1 and 2) and prevent any sag in wire harness 12 along axis A away from the radiator tank 14. Thus the wire harness securing member 64 can provide control over the amount or length of the wire harness 12 extending between the first and second mounting brackets 40 and 42.

The coupling member 66a includes a vertical member 68 and a plurality of horizontal members 70 each mounted to the vertical member 68 and extending generally perpendicular thereto. Together the vertical member 68 and the horizontal members 70 provide the coupling member 66a with generally a fir tree configuration. The horizontal members 70 are generally flexible, and are configured to flex when inserted through an opening defined by the inner vertical flange 52, and expand once passed through the opening in order to secure the first retention member 60a to the inner vertical flange 52.

Figure 4B:
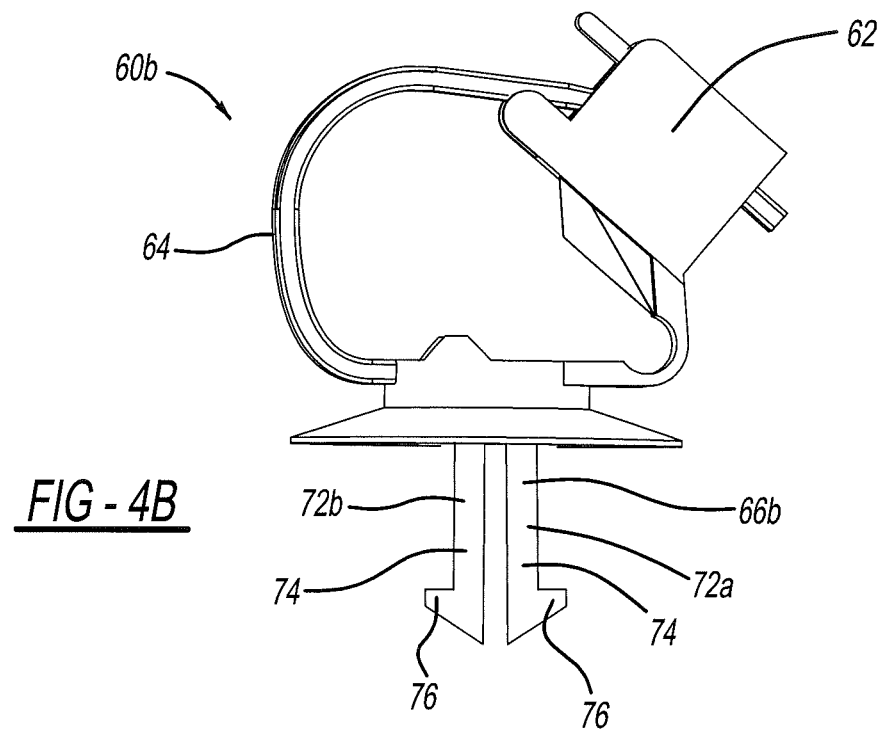
FIG. 4B is a perspective view of another retention member according to the present teachings.

With reference to FIG. 4B, a second retention member 60b is illustrated. The second retention member 60b can be used in place of the first retention member 60a. The second retention member 60b includes the body 62 and the wire harness securing member 64 of the first retention member 60a, but a coupling member 66b, that is different from the coupling member 66a.

The coupling member 66b includes a pair of feet 72a and 72b, and is sometimes referred to as a "rosebud" clip. Each foot 72a and 72b includes an elongated portion 74 with an angled portion 76 at a distal end thereof. Each one of the elongated portions 74 are generally flexible so as to flex together when inserted through an opening, such as the opening defined in the inner vertical flange 52. Upon passing through the opening, the elongated portions 74 will expand back to their original position and the angled portions 76 will abut portions of the inner surface 56 surrounding the opening in order to retain the first retention member 60a to the inner vertical flange 52, for example.

When either the first or second retention members 60a and 60b are mounted to the first mounting bracket 40, the coupling members 66a or 66b extend through an opening defined in the inner vertical flange 52, such that the body 62 and the wire harness securing member 64 are on a side of the inner vertical flange 52 opposite to the radiator tank 14. The coupling members 66a and 66b are in cooperation of the inner surface 56 in order to secure the first retention member 60a or the second retention member 60b respectively to the inner vertical flange 52.

Figure 2:
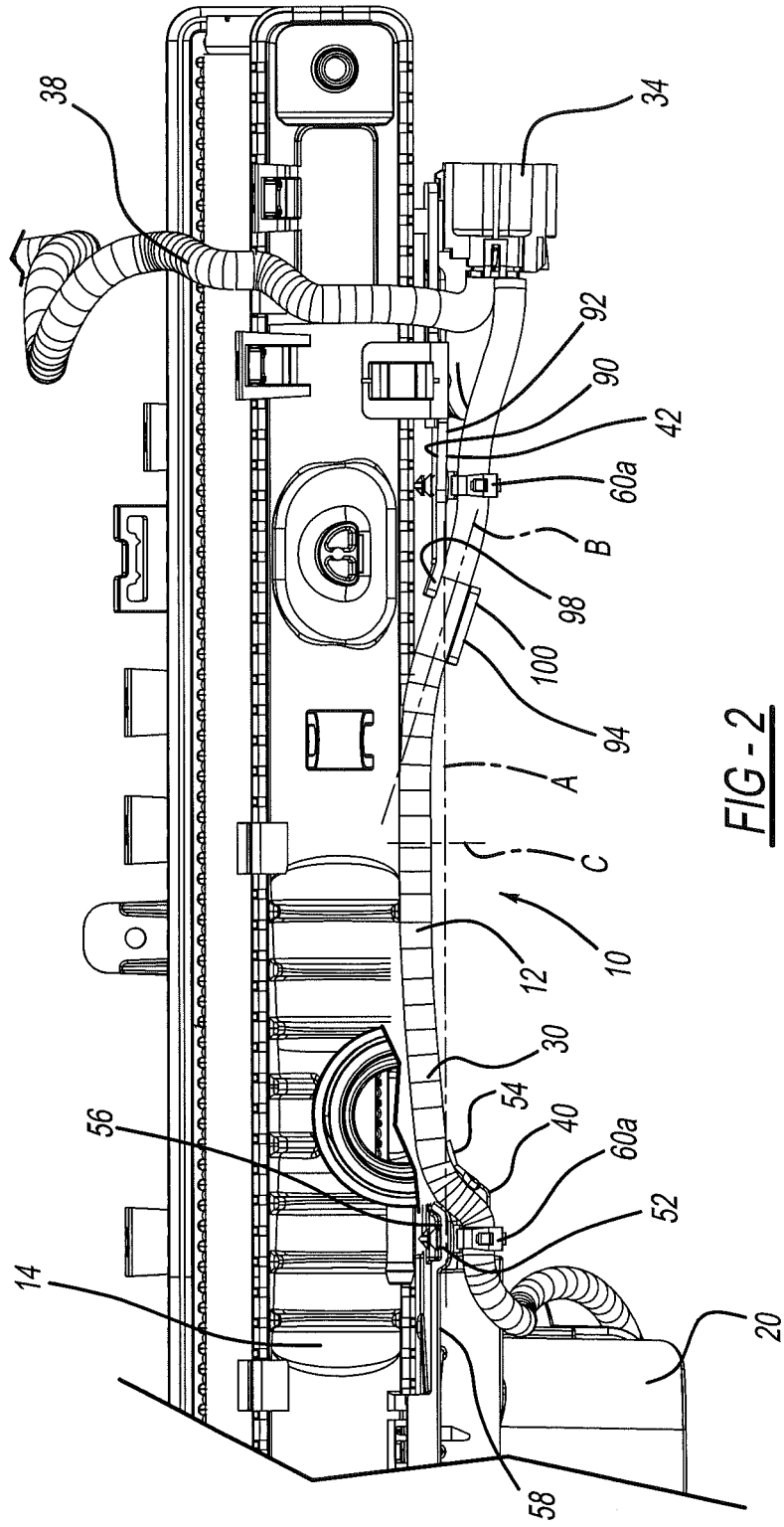
FIG. 2 is a top view of the wire harness mounting assembly of FIG. 1.
Figure 3:
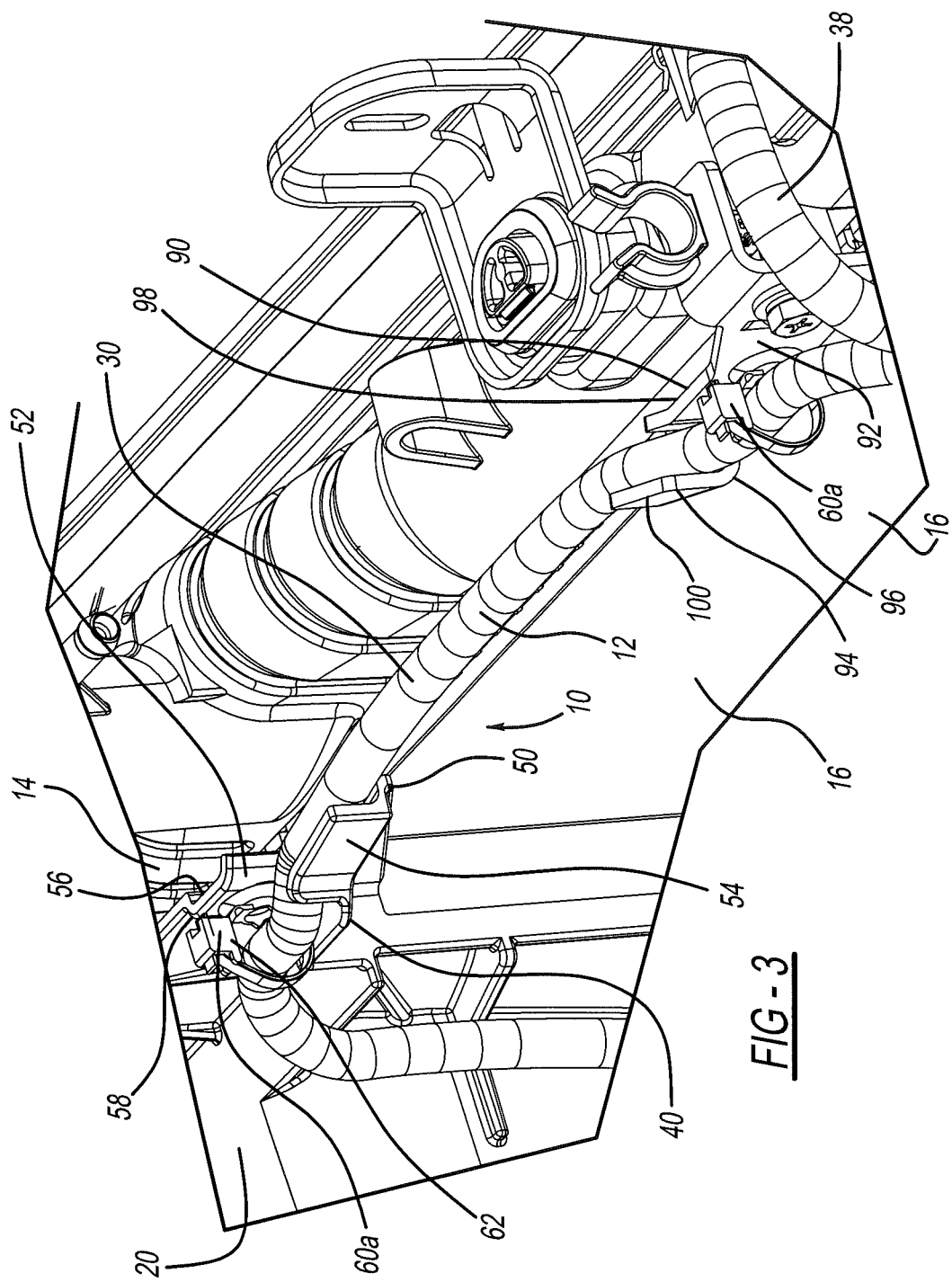
FIG. 3 is a perspective view of the wire harness mounting assembly of FIG. 1.

The second mounting bracket 42 is spaced apart from the first mounting bracket 40, and can be directly mounted to the radiator tank 14 as illustrated in FIGS. 1-3. The second mounting bracket 42 generally includes an inner surface 90 and an outer surface 92, which is opposite to the inner surface 90. The inner surface 90 faces the radiator tank 14, and the outer surface 92 faces away from the radiator tank 14. The second mounting bracket 42 further includes a second guide member 94 at an end of the second mounting bracket 42 closest to the first mounting bracket 40. The second mounting bracket 42 is also referred to as a second guide member.

The second guide member 94 generally includes a base 96, an inner vertical flange 98, and an outer vertical flange 100. The inner vertical flange 98 and the outer vertical flange 100 are spaced apart from one another to accommodate the wire harness 12 therebetween. The inner and outer vertical flanges 98 and 100 extend from the base 96, and are each generally perpendicular to the base 96. The inner vertical flange 98 is closer to the radiator tank 14 than the outer vertical flange 100 is, and the inner vertical flange 98 can include the inner surface 90 of the second mounting bracket 42. The second guide member 94 is angled towards the radiator tank 14 in order to direct the wire harness 12 towards the radiator tank 14, as described further herein. Like the first mounting bracket 40, the second mounting bracket 42 includes a suitable retention member, such as either the retention member 60a or the retention member 60b, which can be mounted thereto during installation of the wire harness mounting assembly.

The first and second mounting brackets 40 and 42 are spaced apart and generally aligned along axis A, as illustrated in FIG. 2. The second guide member 94 is angled along axis B, which intersects axis A, as also illustrated in FIG. 2, for example. More specifically, the inner and outer vertical flanges 98 and 100 and the base 96 do not extend along the axis A, and are angled such that they extend from the remainder of the second mounting bracket 42 towards the radiator tank 14 along axis B, which is angled with respect to axis A towards the radiator tank 14. The second guide member 94 thus directs the flexible tube 30 of the wire harness 12 towards the radiator tank 14. Controlled spacing of the retention member 60a of the first mounting bracket 40 and the retention member 60a of the second mounting bracket 42 along the length of the flexible tube 30, in conjunction with the interface between the flexible tube 30 and the second guide member 94, helps prevent sagging of the flexible tube 30 between the first and the second mounting brackets 40 and 42. The wire harness securing member 64 of each one of the retention members 60a can tightly secure the wire harness 12 to prevent axial movement of the wire harness 12 and prevent sagging between the first and the second mounting brackets 40 and 42. Because the second guide member 94 directs the flexible tube 30 along axis B towards the radiator tank 14, the flexible tube 30 will not extend directly along the axis A between the first and second mounting brackets 40 and 42 along its entire length, and thus will be offset from the axis A towards the radiator tank 14 along at least a portion of a length of the flexible tube 30 between the first and second mounting brackets 40 and 42.

The outer vertical flange 54 of the first mounting bracket 40 may also be angled towards the radiator tank 14 in order to direct the wire harness 12 towards the radiator tank 14, in addition to the second guide member 94 being angled along axis B as described above. Furthermore, the second guide member 94 need not be angled along axis B if the outer vertical flange 54 is angled towards the radiator tank 14, and thus the second guide member 94 may be angled and arranged such that it extends parallel to or along axis A, for example. If only the second guide member 94 is angled towards the radiator tank 14, then the portion of the wire harness 12 between the first and second mounting brackets 40 and 42 that is closest to the radiator tank 14 will be offset from a midpoint C along the axis A between the first and second mounting brackets 40 and 42 on a side of the midpoint C closest to the second mounting bracket 42.

During installation, the retention members 60a or 60b can be coupled to the first and second mounting brackets 40 and 42 respectively with the wire harness 12 already mounted thereto. Alternatively, the wire harness 12 can be connected to the retention members 60a or 60b after the retention members 60a or 60b are coupled to the first and second mounting brackets 40 and 42. Because the retention members 60a or 60b are coupled to the first and second mounting brackets 40 and 42 by inserting them into openings from a side of the first and second mounting brackets 40 and 42 opposite to the radiator tank 14, the retention members 60a or 60b can be secured in place after the first and second mounting brackets 40 and 42 are already installed at the radiator tank 14. The retention members 60a and 60b and the mounting brackets 40 and 42 can thus also be arranged in close proximity to the radiator tank 14 with little clearance required therebetween.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wire harness mounting assembly comprising:
   a first retention member;
   a first guide member;
   a second retention member; and
   a second guide member;
   wherein:
   the first retention member and the first guide member are each configured to be spaced apart from the second retention member and the second guide member to suspend a wire harness across a space defined therebetween; and
   the first guide member extends away from the first retention member at a first angle, and the second guide member extends away from the second retention member at a second angle, the first and second angles extend toward each other and towards a radiator tank when mounted thereto.

2. The wire harness mounting assembly of claim 1, further comprising a first mounting bracket including both the first retention member coupled thereto and the first guide member.

3. The wire harness mounting assembly of claim 2, further comprising a second mounting bracket including both the second retention member coupled thereto and the second guide member.

4. The wire harness mounting assembly of claim 2, wherein the first mounting bracket is integral with a fan shroud of a vehicle radiator assembly.

5. The wire harness mounting assembly of claim 3, wherein the second mounting bracket is a wire harness connector bracket configured to be mounted to the radiator tank at a location spaced apart from the first mounting bracket.

6. The wire harness mounting assembly of claim 1, wherein the first retention member and the second retention member each include a tie strap configured to secure a wire harness.

7. The wire harness mounting assembly of claim 1, wherein the first guide member includes a base and a vertical flange extending therefrom.

8. The wire harness mounting assembly of claim 1, wherein the second guide member includes a base and a pair of spaced apart vertical flanges extending therefrom.

9. The wire harness mounting assembly of claim 1, wherein at least one of the first guide member and the second guide member are configured to direct a wire harness extending therebetween away from an axis extending between the first mounting bracket and the second mounting bracket.

10. The wire harness mounting assembly of claim 9, wherein at least one of the first guide member and the second guide member are configured to direct a wire harness extending therebetween towards the radiator tank when the first and second guide members are mounted at the radiator tank.

11. The wire harness mounting assembly of claim 10, wherein at least one of the first guide member and the second guide member are angled toward the radiator tank along lines that intersect an axis extending between the first mounting bracket and the second mounting bracket.

12. A wire harness mounting assembly comprising:
   a first mounting bracket including:
      a first retention member; and
      a first guide member; and
   a second mounting bracket spaced apart from the first mounting bracket and including:
      a second retention member; and
      a second guide member;
   wherein:
   at least one of the first guide member and the second guide member are oriented to direct a wire harness extending therebetween away from a longitudinal axis extending between the first mounting bracket and the second mounting bracket such that the wire harness is offset from the longitudinal axis at a point between the first guide member and the second guide member; and
   the first guide member extends away from the first retention member at a first angle, and the second guide member extends away from the second retention member at a second angle, the first and second angles extend toward each other and towards a radiator tank when mounted thereto.

13. The wire harness mounting assembly of claim 12, wherein the first guide member and the second guide member each include flanges extending at an angle relative to the longitudinal axis.

14. The wire harness mounting assembly of claim 12, wherein the first mounting bracket and the second mounting bracket are both configured to be mounted at the radiator tank, and are both configured to direct a wire harness extending therebetween towards the radiator tank.

15. The wire harness mounting assembly of claim 12, wherein the first retention member is removably coupled to the first mounting bracket and the second retention member is removably coupled to the second mounting bracket.

16. The wire harness mounting assembly of claim 15, wherein the first retention member and the second retention member each include the following: a tie strap; and both a vertical member and a plurality of horizontal members extending therefrom.

17. The wire harness mounting assembly of claim 15, wherein the first retention member and the second retention member each include the following: a tie strap; and a first retention foot and a second retention foot that is aligned with, and opposite to, the first retention foot.

18. A wire harness mounting assembly comprising:
a first mounting bracket including a first side facing a radiator tank when the first mounting bracket is positioned at the radiator tank, a second side opposite to the first side, and a first wire harness guide member;
a first retention member including a first coupling member configured to extend through an opening defined by the first mounting bracket and engage the first side, and a first wire harness securing member configured to mount a wire harness at the second side;
a second mounting bracket spaced apart from the first mounting bracket including a first side facing the radiator tank when the second mounting bracket is coupled to the radiator tank, a second side opposite to the first side, and a second wire harness guide member angled towards the radiator tank when the second mounting bracket is coupled to the radiator tank to direct the wire harness towards the radiator tank and away from a longitudinal axis extending between the first and the second mounting brackets; and
a second retention member including a second coupling member configured to extend through an opening defined by the second mounting bracket and removably engage the first side thereof, and a second wire harness securing member configured to mount the wire harness at the second side of the second mounting bracket;
wherein the first guide member extends away from the first retention member at a first angle, and the second guide member extends away from the second retention member at a second angle, the first and second angles extend toward each other and towards the radiator tank when mounted thereto.

19. The wire harness mounting assembly of claim 18, wherein the second wire harness guide member is a "U-shaped" member.

20. The wire harness mounting assembly of claim 18, wherein each one of the first and the second wire harness securing members is a tie strap.

* * * * *